(12) United States Patent
Wagner

(10) Patent No.: US 8,669,917 B1
(45) Date of Patent: Mar. 11, 2014

(54) RECEIVERS AND TRANSMITTERS USING DARK MATTER WAVES

(75) Inventor: Orvin Edson Wagner, Rogue River, OR (US)

(73) Assignee: Orvin E. Wagner, Rogue River, OR (US)

( * ) Notice: Subject to any disclaimer, the term of this patent is extended or adjusted under 35 U.S.C. 154(b) by 1006 days.

(21) Appl. No.: 12/590,408

(22) Filed: Nov. 6, 2009

(51) Int. Cl.
*H01Q 1/00* (2006.01)
*H01C 7/10* (2006.01)

(52) U.S. Cl.
USPC ........................................ 343/905; 338/22 R

(58) Field of Classification Search
None
See application file for complete search history.

(56) References Cited

U.S. PATENT DOCUMENTS

| | | | | |
|---|---|---|---|---|
| 3,225,320 A | * | 12/1965 | Solomons | 338/22 R |
| 3,493,913 A | * | 2/1970 | Wagner | 338/22 R |
| 4,053,863 A | * | 10/1977 | Marlor | 430/87 |
| 8,011,255 B2 | * | 9/2011 | Arms et al. | 73/862.325 |

OTHER PUBLICATIONS

Orvin E. Wagner, W-Waves and Plant Communication, NorthW. Science 63(3) 1989 (Pullman, WA (Note: Velocity Round was Incorrect two to Misreading Strip Chart Recorder) Corrected Velocity Near 25 M/S, pp. 119-128.

* cited by examiner

*Primary Examiner* — Trinh Dinh

(57) ABSTRACT

Here are described apparatus and methods for construction and operation of transmitters and receivers for sending and receiving signals. The signals are often low velocity and matter penetrating. The application describes a method of sending information by means of applying electrical signals to salt solution filled wood or other plant matrices. Receivers and transmitters utilize similar along the grain (as in the direction of a tree trunk) matrices. Trees or other plants with ordinary sap also are receivers and possible transmitters with the proper manipulation. Perhaps the chief advantages of the described transmitters and receivers are the matter penetrating qualities of the signals involved. These permit transmission of information through space, matter, and even mountains as found by the inventor.

12 Claims, 2 Drawing Sheets

RECEIVERS AND TRANSMITTERS USING DARK MATTER WAVES

CROSS REFERENCE TO RELATED APPLICATIONS

This application uses modified salt and solvent filled matrices, oriented along the wood grain, thus differing from U.S. Pat. No. 3,493,913 granted 1970 Feb. 3, which is incorporated by reference. This application claims the benefit of PPA Ser. No. 61/198,792 filed 2008 Nov. 10 by the present inventor, which is incorporated by reference.

FEDERALLY SPONSORED RESEARCH

None.

BACKGROUND

Field

Means of transmitting and receiving information using signals that often travel relatively slowly and penetrate all ordinary matter first found in trees in 1988 and lately found to be transmitted and received by salt and ion filled tree and other plant tissue.

SUMMARY OF THE INVENTION

This invention provides a means to send signals through matter and space including solid matter such as a mountain or thick metal. Transmitting and receiving elements utilize plants and salt-solvent filled porous oriented along the grain matrices (e.g. as in trees or other plants). The transmitting matrices are driven by an electric current applied along the grain of the matrices with the desired signal imposed on it.

The background to this invention originated from chopping into a tree and finding that surrounding trees received resultant signals. Recent tests revealed that the phenomenon described is not specifically tree related but is a general phenomenon for the especially described matrices. It was found that applying electrical stimulation to properly chosen and shielded ion filled wood and other plant matrices causes signals to be sent to other properly chosen treated matrices, surrounding trees, and other plants. An appropriate disturbance of a proper transmitter sends signals to properly built receivers. The signals from transmitters may often travel slowly perhaps slower than 25 m/s in air on earth. The applications may include use in submarines or with mining. A person can send undetectable (by previous means) signals to submarines through water or communicate with miners underground.

Dark matter is something that has been identified as being everywhere, penetrating everything, interacts little electromagnetically, and is several times more abundant than ordinary matter and interacts with gravity. I hypothesize that dark matter waves carry the described signals. Other known methods of signal transmission don't permit the sending of information through very thick metal, earth, or many other forms of matter. Different kinds of matter respond differently to the waves perhaps with velocity differences, for example. Previous work indicates that the dark matter wave velocity, where the density of dark matter is different, is inversely proportional to the square root of the density of dark matter. The materials used for transmitters and receivers here are ordinary solvated salt filled or normally sap filled wood or other plant matrices all aligned along the grain. For the purposes of this invention a solvated compound has sufficient solvent present to dissolve or ionize at least part of the compound or compounds in a proper matrix or naturally ion filled plant sap in trees or other plants. Electrically conductive shielding of receivers and transmitters is often usually used to minimize electrical noise because the signals penetrate all ordinary matter. Noise related to the penetrating signals can often be removed by other appropriate means such as filtering. In the work so far much matter penetrating noise has been observed. For example clouds covering and uncovering the sun seem to produce noise peaks in sap, solvent, and salt filled receivers. Or the sun rising in the morning produces its own noise. Much of the penetrating noise may seem to be plant related. Noise is a function of the time of year with summer usually producing peak noise amplitudes.

DRAWING

Reference Numerals

Figure 1:
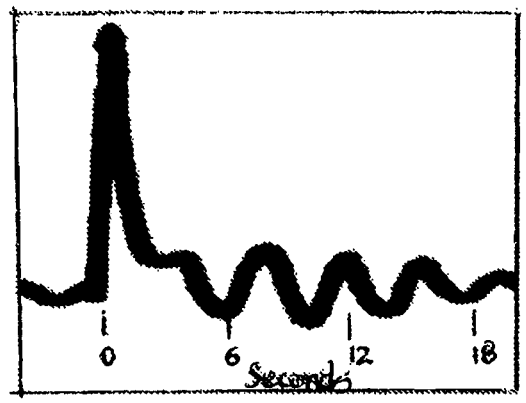
FIG. 1 is a graph of a signal transmitted with an electrical pulse (9 v.) applied to a salt solution filled, shielded, along the grain Douglas fir wood matrix (4 cm×47 cm; aligned vertically with a receiving Ponderosa pine tree grain). The signal moves back and forth between the matrix and the tree 43.9 meters away as recorded on a strip chart recorder. The vertical spacing between trees contacts was 5 m.
Figure 2:
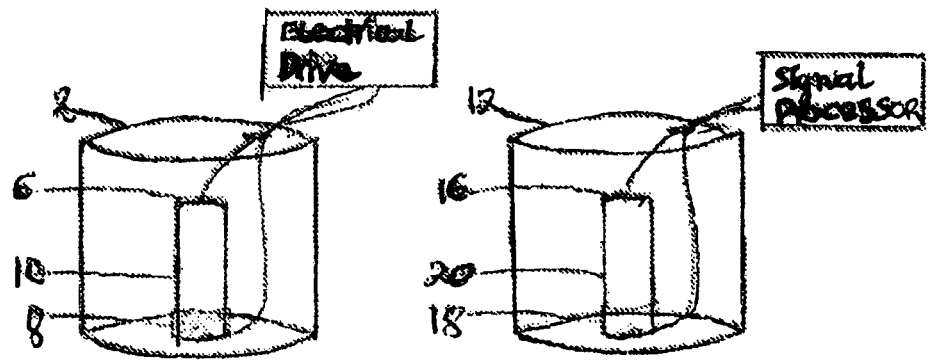
FIG. 2 presents drawings of shielded transmitter and receiver along the grain matrices. Since transmitters and receivers use similar (often identical) aligned along the grain of the wood or other plant matrices they are shown together with the transmitter having an input while the receiver has an output.
Figure 3:
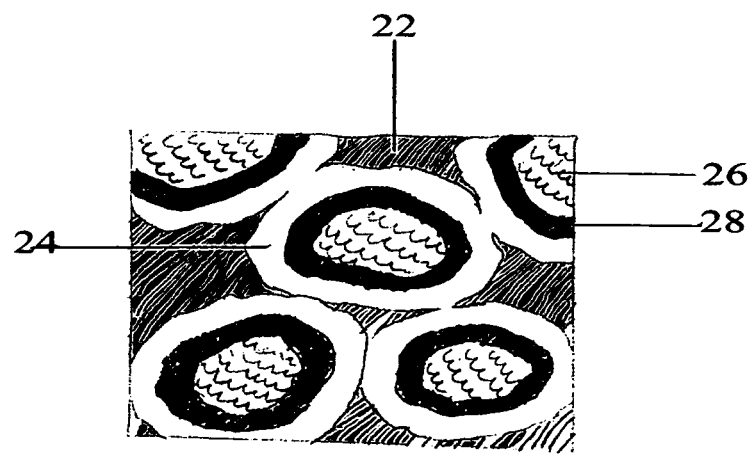
FIG. 3 A possible representation of an ion filled matrix portion, as well as the pore structure of a tree or other plant containing sap. The structure varies from plant species to plant species.
Figure 4:
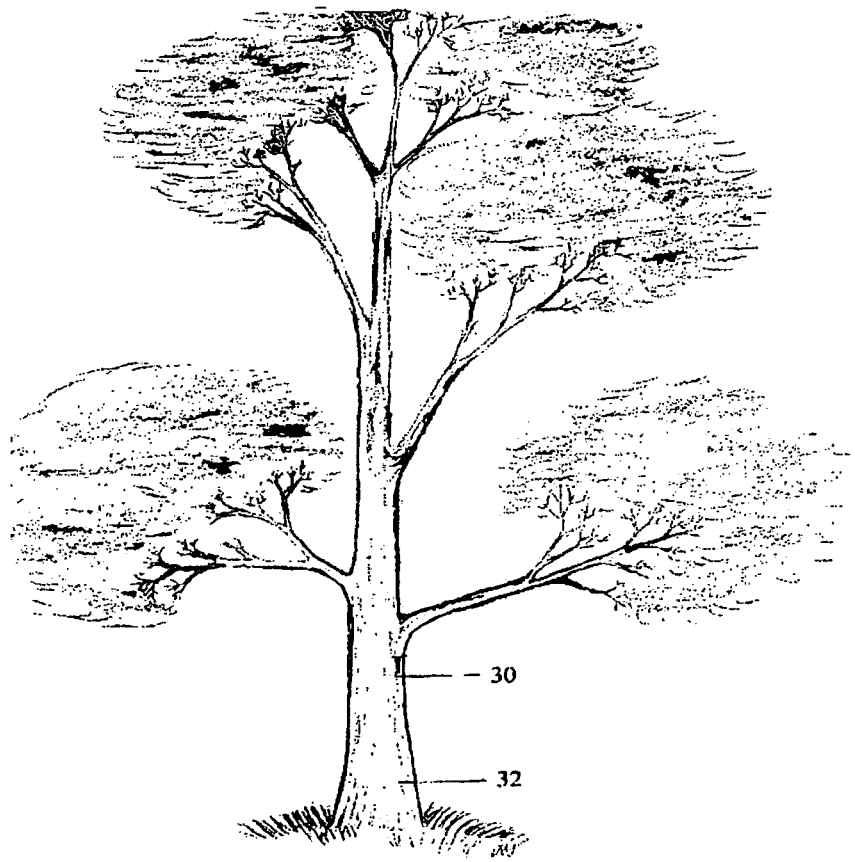
FIG. 4. Figure of a tree or other plant connected for transmission or reception of communication with other ion filled aligned along the grain entities such as other trees or plants or ion filled along the grain matrices.

2—container and conducting shield
4—electrical drive input
6—contact
8—holder and contact
10—transmitting element
12—container and conducting shield
14—output
16—contact
18—holder and contact
20—receiving element
22—matrix container and conducting shield
24—pore mechanical drive and holder
26—salt particulate holder
28—solvent transmitting element
30—top tree probe
32—bottom tree probe

DETAILED DESCRIPTION

Numbers 10 and 20 are relatively long (to increase sensitivity) porous matrices, whose (often split from the xylem of a tree trunk) along the grain pores are substantially filled with solvated salt particulates. Shields of electrical conducting material are shown for use in keeping out electromagnetic fields. The shields are might be optional depending on the fields in the surroundings and applications of the transmitter and receiving elements. Without shields, holders (8, 18) might be optional. Instead of having the electrical driving equipment (4) connected outside of the shield, for the transmitting element (10), it might be better to include this equipment within the shield. This could prevent electromagnetic interference from contaminating the signal. This might also be true for the equipment connected to the receiver output (14). Amplifiers and other processing equipment for the received signal could often be placed inside the receiver shield. The size, shape, and thickness of the shielding would be determined by the needs of the user. The longer the transmitting and receiving elements, the stronger the resultant signals. The conducting contacts (6, 16) can be painted or evaporated on or otherwise applied. Metal such as steel pressed into the transmitting and receiving elements, a short distance, also function using the proper elements. The holders (which hold the transmitting and receiving elements in place) could be plastic pipe or other appropriate materials. The contacts on the bottoms of the elements are not shown because the holder would likely cover them (8, 18), unless they were placed without holders in place or outside of the holders. The receiving and transmitting elements (10, 20) could actually be the holders. This depends on the transmitting or receiving elements and contact composition. The dimensions and variations in shape are as needed by the user. Receiving and transmitting elements can be trees or other plants because they are essentially ion filled along the grain matrices. Contacts, on plants such as trees, need to be placed far apart to increase the receiver sensitivity or transmitting ability.

The transmitting and receiving elements contemplated by the inventor may be fabricated by several acceptable methods. This would vary according to the chosen matrix material, salt, and solvent. Freedom is available in choosing a wood or other plant matrix although some useable materials appear to work better than others. In the application here it is important that the matrix possess open pores, which interconnect along the grain as in wood. Xylem wood provides this feature, for example, which connects mostly in one direction and operates with the electrical signal applied or received along the grain direction.

Acceptable solvated salts may include $FeCL_3$, $NaCI$, Urea, $KNO_a$, $KI$, $NaBr$, $KC_1$, $NaNO_3$, $AgNO_3$, $KNO_2$, $MgSO_4$, and many others including mixtures of these and other compounds. The choice of solvent may vary widely. Water so far seems to work best but, methyl alcohol, and ethyl alcohol seem useful. The choice of salt will affect ones choice of solvent, all in accordance with well-known principles of chemistry relating to solubility, compatibilities, etc. If trees are used for transmitters or receivers the xylem tissue is filled with sap, which is water and various ionic compounds.

In preparing solvated salts, the inventor prepares a solution of the salt and solvent. Subsequent treatment, as discussed hereinafter, dictates the quantity of solvent retained in the pores in association with the salt particulates. For example the inventor selects a piece of fir xylem wood as described in FIG. 1 to serve as the matrix material using a water solvent. The matrix is usually heat treated in hot water, to remove the tars and resins. Then the solution is changed to concentrated solution of the desired salt. In FIG. 1 it is NaCI. The matrix is then held in a usually hot concentrated salt solution until the desired matrix penetration is achieved. The treatment duration and temperature determines the solution penetration of the matrix. After removal from solution the matrix is used or dried to a preselected ratio of salt and solvent weight to-matrix weight.

A transmitter matrix has contacts placed as far apart as possible. The transmitting element is driven with an electrical source with a waveform and amplitude that provides the desired signal. Research indicates that the longer the transmitting element the stronger the signal amplitude. A receiver is built similarly to a transmitter. The output from contacts on the receiver is wired to the desired equipment. This equipment could be an amplifier, oscilloscope, recorder, or other applicable device. Often the received signal is weak, a millivolt or less, and requires amplification. The output from the receiver can be modified, amplified, and otherwise changed depending on the application. Since the transmitter output signals are matter penetrating, transmitters and receivers can be placed in electrically conducting shields. These can be metal of differing shapes to eliminate undesirable electrical noise. The latter may not always be necessary, depending on the signal desired by the user or if the equipment is in a shielded environment. In FIG. 1 an electrical pulse of 9 volts was applied to a shield salt solution filled fir xylem matrix. This sent signals to a receiving salt solution filled receiving element and to surrounding trees. Received signals were recorded on a sensitive strip chart recorder. The received signal from a Ponderosa pine tree is shown with an added time scale. The user needs to be aware that noise signals, other than ordinary electromagnetic, may be present and penetrate shields. These require methods, such as filtering, to eliminate. In FIG. 1 no noise was apparent in spite of an unshielded tree receiver, which was often the case. The strip chart recorder used, for the receiver, was noise insensitive.

It is noted that the theory of operability of the transmitters and receivers is based upon present knowledge and interpretation of the experimental data. The invention is not intended to be restricted to the theory expounded herein, rather, the invention is to be restricted only by the claims as follows.

What is claimed:

1. Material for use in transmitters and receivers for matter penetrating waves comprising: a relatively electrically non-conductive porous matrix aligned along the grain of wood or other plant material, where along the grain is defined as parallel to sap conducting xylem conduits, which is essentially chemically inert with respect to other constituents of said material and having a multiplicity of interconnecting pores from wood that is split from a tree trunk or other plant material; a quantity of ionizable substance, comprised of at least naturally occurring ions or at least one salt or other ionizable compound, penetrated in at least a major portion of the pores of said matrix, and a quantity of solvent intimately associated with said ionizable substance in said pores, wherein the solvent is dispersed within said matrix and said solvent is ionizing at least part of said ionizable substance.

2. The invention of claim 1 wherein the matrix for the transmitting and/or receiving elements is wood or other plant material with an along the grain orientation.

3. The invention of claim 1 wherein the solvent in the transmitters and/or receivers are selected from the group consisting of water, ethanol, and methanol.

4. The invention of claim 1 wherein the ionizable substance in the receivers and/or transmitters are solid inorganic salt particulates or naturally occurring ions as in plant sap.

5. The transmitters and/or receivers of claim 1 wherein said ionizable substance comprises a mixture of at least two salts.

6. A transmitter comprising:
a relatively electrically non-conductive porous matrix aligned along the grain of wood or other plant material, where along the grain is defined as parallel to sap conducting xylem conduits, which is essentially chemically inert with respect to other constituents of said transmitter and having a multiplicity of interconnecting pores therein along the grain, a quantity of ionizable substance, comprised of at least one salt or other ionizable compound, penetrated in at least a major portion of the pores of said matrix, a quantity of liquid solvent intimately associated with said ionizable substance in said pores, wherein the solvent is dispersed within said matrix and said solvent is ionizing at least part of said ionizable substance, and at least two electrical leads communicating with said along the matrix.

7. A transmitter of claim 6 that is shielded with conductive materials to minimize electrical noise.

8. A transmitter of claim 6 that is a tree or another plant, and at least two electrical leads communicating with such a plant for transmission of signals.

9. The use of an electrical signal or signals applied to a transmitter of claim 6 to send a signal.

10. A receiver comprising: a relatively electrically non-conductive porous matrix aligned along the grain of wood or other plant material, where along the grain is defined as parallel to sap conducting xylem conduits, which is essentially chemically inert with respect to other constituents of said receiving element and having a multiplicity of interconnecting along the grain pores therein,
    a quantity of ionizable substance, comprised of at least one salt or other ionizable compound, disposed in at least a major portion of the pores of said matrix,
    a quantity of solvent intimately associated with said ionizable substance in said pores,
    wherein the solvent is dispersed within said matrix and said solvent is ionizing at least part of said ionizable substance,
    and at least two electrical leads communicating with said matrix.

11. A receiver of claim 10 that is shielded with conductive materials to minimize electrical noise.

12. A receiver of claim 10 that is a tree or another plant, and at least two electrical leads along the trunk or stem communicating with such a plant for reception of signals.

\* \* \* \* \*